Sept. 2, 1969  G. BIRKETT ET AL  3,464,934
SELECTIVELY EXPANDED PLASTIC ARTICLES, THEIR PROCESS
OF MANUFACTURE AND AN INK COMPOSITION
USED IN THEIR MANUFACTURE
Filed June 7, 1966

INVENTORS
GORDON BIRKETT
DONALD JOHN CRAM
BY,
Crowley, Kiely, & Stevens
ATTORNEY

United States Patent Office 3,464,934
Patented Sept. 2, 1969

3,464,934
SELECTIVELY EXPANDED PLASTIC ARTI-
CLES, THEIR PROCESS OF MANUFAC-
TURE AND AN INK COMPOSITION USED
IN THEIR MANUFACTURE
Gordon Birkett, Costock, and Donald John Cram, Lough-
borough, England, assignors to Fisons Industrial Chem-
icals Limited, Loughborough, England
Filed June 7, 1966, Ser. No. 555,668
Claims priority, application Great Britain, June 12, 1965,
24,906/65; Oct. 1, 1965, 41,858/65
Int. Cl. B32b 3/02; B41c 1/08; B29d 7/22
U.S. Cl. 260—2.5                         23 Claims

ABSTRACT OF THE DISCLOSURE

Selective expansion of a thermoplastic polymeric material which is achieved by forming into a sheet an expandable mix containing a polymeric material and a blowing agent; applying to selected areas of the surface of the sheet a composition containing a material which lowers the decomposition temperature of the blowing agent; and heating the sheet to a temperature and for a time that in the aforementioned selected areas of the sheet, the blowing agent is decomposed to a greater degree than in the remaining areas and the sheet is thereby differentially expanded.

---

The present invention relates to improved processes for the manufacture of expanded thermoplastic polymeric materials.

It is well known that azodicarbonamide is a blowing agent for thermoplastic polymeric materials, by which term is meant both rubber and synthetic resinous materials, such as polyvinyl chloride, polyvinyl acetate, polyethylene and the like; azodicarbonamide, e.g., is widely used as a blowing agent for polyvinyl chloride.

Azodicarbonamide, when pure has a decomposition point of about 225° C. It is known that this decomposition point can be lowered by admixture with various compounds, usually referred to as kickers. Such compounds include basic compounds of heavy metals such as basic lead carbonate and zinc octoate.

It is frequently desired to obtain an embossed effect on surfaces of expanded plastics for example for decorative effect, and these are obtained by using embossing rolls.

It has now been found that relief effects may be produced without the use of embossing rolls by applying a pattern of a kicker to the surface of a mix containing a thermoplastic polymeric material and azodicarbonamide and like blowing agents before the final heat expansion stage. By heating the mix to a temperature below the normal decomposition temperature of the azodicarbonamide the area in contact with the kicker expands to a greater extent than the rest, so that nonuniform expansion is obtained, and the relief effects are obtained. It is surprising that this effect is obtained where the kicker is only present at the surface as opposed to being incorporated in the mix.

Figure 1:
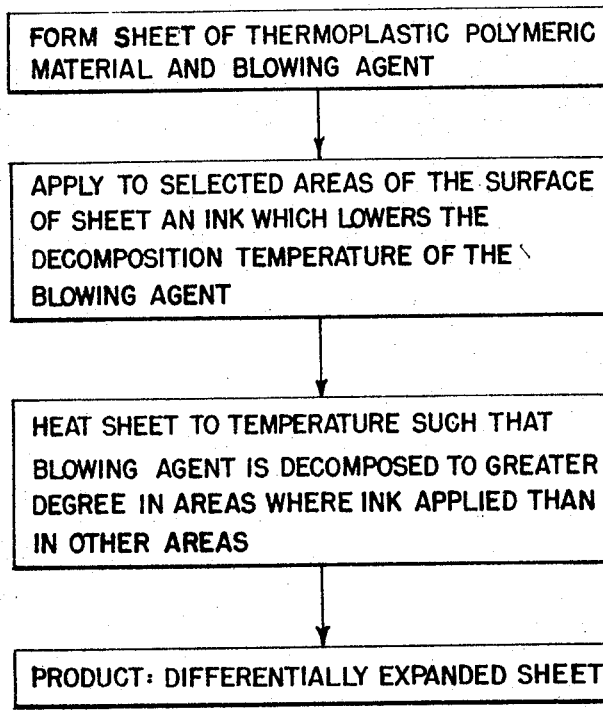
Figure 2:

The invention will be better understood from the following detailed description of various embodiments of the invention when read in conjunction with the drawings wherein:

FIGURE 1 illustrates a flow diagram showing the method of the present invention; and FIGURE 2 is a schematic representation of one method of producing a sheet by the present invention.

Accordingly the present invention is for a process for embossing by selective expansion a thermoplastic polymeric material which as will be seen by referring to FIG. 2, comprises forming into sheet form 10 an expandable mix containing a thermoplastic polymeric material and a blowing agent, applying to selected areas of the surface of the sheet a composition 12 containing a kicker for the blowing agent, and heating the sheet to a temperature 13 and for a time such that in those areas 15 of the sheet in contact with the kicker composition, the blowing agent is decomposed to a greater degree than in the remaining areas 16 and the sheet 14 is thereby differentially expanded. As may be expected, in this process the time and temperature of the final heating stage are interrelated.

The process described is of special application in the manufacture of flooring, wall and ceiling covering materials. For flooring materials, heavy grade materials are obviously required, and the flooring material is usually made of a textile base laminated to the main supporting plastic sheet which may be expanded or nonexpanded and to which is laminated the surface sheet, which is differentially expanded to produce the decorative wear surface. For wall and ceiling covering materials, which may be considered as wallpapers, these comprise a paper or fabric base on to which is spread or laminated the surface sheet, which is differentially expanded to produce the desired decorative surface.

The differentially expanded sheet is prepared by the interaction of the sheet formed from the expandable mix, and the composition containing the kicker hereinafter referred to for convenience as the "activator ink."

The thermoplastic polymeric material may be a condensation polymer such as a polyamide for example polycaprolactam or polyaminoundecanoic acid, or a polyester for example terephthalate polyesters. The thermoplastic polymeric material may also be an addition polymer such as a polyolefin, for example polyethylene or polypropylene, a polyacrylate for example polymethylmethacrylate, a polystyrene or a polymerisation product of a halogen substituted olefin such as polyvinyl chloride.

The blowing agent may be any of the conventional blowing agents the decomposition temperature of which is lowered in the presence of a variety of compounds known as kickers. It is, however, essential to select a blowing agent appropriate to the polymer being used; that is the blowing agent must decompose in the presence of a kicker at a temperature at which the polymer or a composition containing it is in a condition to be expanded. Examples of blowing agents include azodicarbonamide, barium azodicarboxylate, p,p'-oxybis(benzene sulphonyl hydrazide), p,p'-oxybis(benzene sulphonyl semicarbazide) and the like.

The expandable mix may also contain other ingredients suitable for obtaining a desirable product. These additional ingredients include plasticizers, solvents, diluents, extenders, dyes, hardeners, stabilizers and the like.

The kicker used in the activator ink may be any of a number of compounds which lower the decomposition temperature of the blowing agent including compounds of zinc such as zinc oxide, zinc octoate, zinc nitrate, zinc fatty acid soaps, compounds of cadmium such as cadmium octoate, cadmium caproate, cadmium laurate, cadmium myristate, cadmium fatty soaps, compounds of lead such as lead carbonate, lead phthalate, lead phosphite, lead stearate, urea, borax, ethanolamine, glycols and other blowing agents such as benzene sulphonhydrazide. The activator ink suitably contains 2 to 15% by weight of kicker based on the weight of the ink. Preferably the activator ink contains 7 to 12% by weight of kicker based on the weight of the ink.

The activator ink may also contain a number of other components including polymeric materials, pigments or dyes, solvents, dispersants, diluents and the like.

According to a preferred embodiment of the invention there is provided a process for embossing by selective expansion a thermoplastic polymeric material which comprises forming into sheet form an expandable mix containing a polymer or copolymer derived from vinyl chloride and azodicarbonamide as a blowing agent, applying to selected areas of the surface of the sheet a composition containing a kicker for the azodicarbonamide and heating the sheet to a temperature and for a time such that in those areas of the sheet in contact with the kicker composition, the blowing agent is decomposed to a greater degree than in the remaining areas and the sheet is thereby differentially expanded.

The polymer or copolymer derived from vinyl chloride may be polyvinyl chloride, a copolymer of vinyl chloride with the vinyl esters of fatty acids such as vinyl acetate or with other polymerisable vinyl-containing monomers such as vinylidene chloride, acrylic acid, styrene and the like.

The particle size of the azodicarbonamide is important in obtaining optimum differential expansion between the activated and unactivated areas of the sheet of the expandable mix. Preferably the azodicarbonamide has a surface area in the range 4,000 to 6,000 square centimetres per gram, the particle size range lying between 3 and 15 microns. The amount of azodicarbonamide is preferably 1–10% by weight based on the weight of the vinyl chloride containing polymer.

The composition containing the kicker, that is the activator ink, consists essentially of a mixture of a solution or dispersion of the kicker and a solution or dispersion of a film former or binder resin and a dye or pigment. A wide variety of kickers for the azodicarbonamide may be used such as those listed above. Preferably, however, the kicker is a zinc compound such as zinc octoate or zinc nitrate. The dispersant for the kicker is preferably an ester such as ethyl acetate. Suitable film formers or binder resins include polyvinyl chloride or a copolymer of vinyl chloride and vinyl acetate, acrylic resins, urethanes, cellulose acetate, polyesters, polystyrenes, rubbers, epoxy resins, silicones and other polymers. Solvents or dispersants for the film former or binder are preferably those which act as a dispersant for the polymer or copolymer derived from vinyl chloride used in the expandable mix since in this way improved migration of kicker is obtained from the activator ink into the sheet of expandable mix. Suitable solvents include ketones such as tetrahydrofuran, cyclohexanone, methyl ethyl ketone, esters such as ethyl acetate, chlorinated hydrocarbons such as ethylene dichloride, methylene chloride, nitro compounds such as nitro benzene, nitropropane, etc. In order to "offset" the volatility of the solvents in the activator ink which is undesirable in printing operations a diluent may be used, suitable diluents including hydrocarbons such as toluene and xylene.

The activator ink desirably contains 5% to 25% by weight of the kicker and preferably contains 7% to 20% by weight of the kicker. The consistency of the activator ink is important if optimum results are to be obtained. The solids content of the ink is suitably of the order of 10–15% solids by weight of the ink. The viscosity of the ink is suitably 1,000 to 2,000 centipoises for example 1,600 centipoises.

The expandable mix is preferably made as a plastisol. Suitable plasticizers for making the plastisol include phthalates such as butyl benzyl phthalate, dioctyl phthalate, dialphanyl phthalate and diisooctyl phthalate, and phosphoric acid esters such as tricresyl phosphate and octyl diphenyl phosphate.

The amounts of plasticizers and fillers present in the expandable mix may vary over a wide range. The amount of plasticizer may comprise for example 40 to 100 parts per 100 parts of polymers. Preferably the amount of plasticizer is in the range 50–80 parts per 100 parts of polymer. Better results are obtained with the lower proportions of plasticizer, as this permits the easier penetration of the activator ink. The amount of filler may comprise for example 1–50 parts per 100 parts of resin—the higher proportions of filler are preferred, since these also permit the easier penetration of the activator ink.

The plastisol may incorporate stabilizers to reduce degradation of the polymer by heat and light. Suitable stabilizers include, lead, cadmium, barium, zinc and other metal salts such as basic lead phosphite, carbonate and phthalate, zinc oxide, barium and cadmium octoate, caproate, laurate, myristate as well as combinations of barium, zinc and cadmium, fatty acid soaps. Preferably the plastisol contains 0.5 to 5 parts of stabilizer per 100 parts by weight of polymer.

The stabilizers which may be used in the plastisol also operate to varying degrees as activators for azodicarbonamide. In selecting a suitable stabilizer therefor it is important that the kicking effect of the stabilizer should be less than the kicking effect of the kicker used in the activator ink. In this respect it has been found particularly beneficial to use as a stabilizer a mixture containing cadmium and barium soaps such as the stearates and laurates. Preferably a mixture is used containing a high proportion of barium.

The plastisol may also incorporate dyes or pigments, diluents such as hydrocarbons for example toluene, fillers and the like.

The amount of azodicarbonamide in the plastisol will vary according to the degree of expansion required. Suitably 1 to 20 parts by weight of azodicarbonamide will be used for every 100 parts by weight of polymer. Preferably this proportion is in the range 2 to 10 parts by weight of azodicarbonamide for every 100 parts by weight of polymer.

The expandable mix may be formed into a sheet by extruding, casting, calendering or spreading the mix. Preferably the expandable mix is spread as a plastisol onto a suitable surface, which may or may not provide a permanent backing, and the plastisol is gelled; that is the plastisol is heated for a period of time sufficient for the plastisol layer to assume a solid tack-free state but insufficient to decompose the azodicarbonamide.

The degree of gellation of the expandable mix at the time of the application of the activator ink is important if the desired effect is to be obtained. In order to print the surface of the sheet by conventional means the physical condition of the sheet must be such that adhesion to the printing rollers does not occur. However, if the sheet of the expandable mix is gelled to too great an extent the desired effect is not obtained. For optimum results the sheet of the expandable mix should be gelled to the minimum extent which will permit printing. Preferably the sheet is gelled at a temperature in the range 100° C. to 150° C. for a period of time in the range 2.5 minutes to 0.5 minute. Desirably the higher the temperature of gellation the lower is the time of gellation.

The backing may be formed of a resinous material, a woven fabric, impregnated felted fibre or a release material such as paper coated for example with silicone materials.

The activator ink is preferably applied to the gelled plastisol by any of the conventional printing techniques. Desirably before any further steps are taken in the process the gelled plastisol with its printed design is allowed to stand for a period of time for example from 1 to 24 hours. The precise length of time will depend on the degree of differential expansion required, the differential increasing as the length of time increases.

If desired a wear surface may be provided on the embossed surface. This may be achieved by applying to the printed and gelled plastisol a layer of a thermoplastic polymeric material which preferably does not contain a blowing agent.

The printed and gelled plastisol may be heated in a number of ways for example in hot air ovens or by infrared heaters. The temperature to which the printed and gelled plastisol is heated is above the decomposition temperature of the kicked azodicarbonamide, and is preferably in the range 150–210° C. The time for which the printed and gelled plastisol is heated depends on the temperature and the degree of decomposition of the azodicarbonamide required but is preferably in the range 15–300 seconds.

The following examples are given to illustrate the present invention; the parts are by weight.

EXAMPLE 1

A polyvinyl chloride paste consisting of:

| | Parts |
|---|---|
| Polyvinyl chloride | 100 |
| Dioctyl phthalate | 65 |
| Azodicarbonamide having a surface area about 5,000 square centimetres per gram | 3 |
| Barium/cadmium stabilizer with a high percentage of barium sold under the name Lankro Mark TT | 2 |
| Whiting | 5 |
| Pigment | 3 | was spread in the usual way onto fabric or release paper and then gelled to a low degree at a temperature of 125° C. for 1.5 minutes giving a sheet of gelled material 0.5 millimetre thick.

An ink consisting of:

| | Parts |
|---|---|
| Polyvinyl chloride/acetate copolymer | 20 |
| Acrylate polymer | 31 |
| Toluene | 73 |
| Methyl ethyl ketone | 174 |
| Methyl isobutyl ketone | 30 |
| Tetrahydrofuran | 68 |
| Pigment paste | 15 |
| Zinc octoate | 38 | having a viscosity of 1,600 centipoises was applied as a pattern to portions of the surface.

The ink was allowed to dry, and a transparent film made up of:

| | Parts |
|---|---|
| Polyvinyl chloride | 100 |
| Nylon acid ester (mixed isodecyl esters of adipic, glutaric and succinic acids) | 40 |
| Stabilizer dibutyl tin dilaurate | 3 |

The whole was then divided into three parts each part being heated to a temperature of 195° C. for approximately one minute but the time elapsing between the application of the ink and heating to 195° C. being 24 hours, 2 hours and almost zero hour respectively. In each case the film where the ink had contacted was expanded to a greater extent thereby giving an embossed effect. Where the time elapsing between printing and heating was 24 hours the depth of the emboss was 0.38 millimetre, where it was 2 hours the depth was 0.20 millimetre and where it was almost zero hour and depth was 0.12 millimetre.

EXAMPLE 2

A polyvinyl chloride paste consisting of:

| | Parts |
|---|---|
| Polyvinyl chloride | 100 |
| Butyl benzyl phthalate | 45 |
| Dioctyl adipate | 25 |
| Azodicarbonamide | 2 |
| Barium/cadmium stearate stabilizer with a high percentage of barium | 2 |
| Whiting | 30 |
| Pigment | 3 | was spread in the usual way onto fabric or release paper and then gelled to a low degree at a temperature of 105° C. for 1.75 minutes.

An ink consisting of:

| | Parts |
|---|---|
| Polyvinyl chloride/acetate copolymer | 20 |
| Acrylate polymer | 31 |
| Toluene | 73 |
| Methyl ethyl ketone | 174 |
| Methyl isobutyl ketone | 30 |
| Tetrahydrofuran | 68 |
| Pigment paste | 15 |
| Zinc nitrate | 38 | having a viscosity of 1,600 centipoises was applied as a pattern to portions of the surface.

The ink was allowed to dry, and a transparent film made up of:

| | Parts |
|---|---|
| Polyvinyl chloride | 100 |
| Nylon acid ester (mixed isodecyl esters of adipic, glutaric and succinic acids) | 40 |
| Stabilizer dibutyl tin dilaurate | 3 | spread over the surface. After 2 hours the whole was subjected to a temperature of 185° for approximately 2 minutes. Only the film where the ink had been applied was expanded, producing an embossed effect 0.18 millimetre deep corresponding to the pattern applied.

EXAMPLE 3

A paste of a vinyl acetate, vinyl chloride copolymer consisting of:

| | Parts |
|---|---|
| Copolymer | 100 |
| Dioctyl phthalate | 70 |
| Azodicarbonamide | 3 |
| Barium stearate | 2 |
| Whiting | 5 |
| Pigment | 3 | was calendered in the usual way and then gelled to a low degree at 120° for 1 minute.

An ink consisting of:

| | Parts |
|---|---|
| Polyvinyl chloride/acetate copolymer | 20 |
| Acrylate polymer | 31 |
| Toluene | 73 |
| Methyl ethyl ketone | 174 |
| Methyl isobutyl ketone | 30 |
| Tetrahydrofuran | 68 |
| Pigment paste | 22.5 |
| Zinc/cadmium laurate with a high percentage of zinc | 38 | having a viscosity of 1,600 centipoises was applied as a pattern to portions of the surface.

The ink was allowed to dry, and a transparent film made of up:

| | Parts |
|---|---|
| Polyvinyl chloride | 100 |
| Nylon acid ester (mixed isodecyl esters of adipic, glutaric and succinic acids) | 40 |
| Stabilizer dibutyl tin dilaurate | 3 | spread over the surface. After two hours the whole was subjected to a temperature of 175° for approximately 3 minutes. Only the film where the ink had been applied was expanded, producing an embossed effect 0.15 millimetre deep corresponding to the pattern applied.

EXAMPLE 4

A polyvinyl chloride paste consisting of:

| | Parts |
|---|---|
| Polyvinyl chloride | 100 |
| Modified dioctyl phthalate | 55 |
| Epoxidised soya bean oil | 5 |
| Azodicarbonamide | 4 |

| | Parts |
|---|---|
| Barium/cadmium/zinc stearate with a very low percentage of zinc | 2 |
| Whiting | 5 |
| Pigment | 3 | was spread in the usual way onto fabric or release paper and then gelled to a low degree at a temperature of 125° C. for 1.5 minutes.

An ink consisting of:

| | Parts |
|---|---|
| Polyvinyl chloride/acetate copolymer | 20 |
| Acrylate polymer | 31 |
| Toluene | 73 |
| Methyl ethyl ketone | 174 |
| Methyl isobutyl ketone | 30 |
| Ethyl acetate | 68 |
| Pigment paste | 15 |
| Zinc octoate | 38 | having a viscosity of 1,600 centipoises was applied as a pattern to portions of the surface.

The ink was allowed to dry, and a transparent film made up of:

| | Parts |
|---|---|
| Polyvinyl chloride | 100 |
| Nylon acid ester (mixed isodecyl esters of adipic, glutaric and succinic acids) | 40 |
| Stabilizer dibutyl tin dilaurate | 3 | spread over the surface. After 5 hours the whole was subjected to a temperature of 195° for approximately 1 minute. Only the film where the ink had been applied was expanded, producing an embossed effect 0.25 millimetre deep corresponding to the pattern applied.

EXAMPLE 5

A polyvinyl chloride paste consisting of:

| | Parts |
|---|---|
| Polyvinyl chloride | 100 |
| Dioctyl phthalate | 70 |
| Azodicarbonamide | 5 |
| Barium/cadmium stearate stabilized with a high percentage of barium | 1 |
| Whiting | 30 |
| Pigment | 3 |
| Hexylene glycol | 1½ | was spread in the usual way onto fabric or release paper and then gelled to a low degree at a temperature of 110° C. for 1.75 minutes.

An ink consisting of:

| | Parts |
|---|---|
| Acrylate polymer | 32 |
| Toluene | 48 |
| Tetrahydrofuran | 10 |
| Zinc octoate | 10 |
| Methyl ethyl ketone | 6 |
| Pigment | 3 | having a viscosity of 1,600 centipoises was applied as a pattern to portions of the surface.

The ink was allowed to dry, and a transparent film made up of:

| | Parts |
|---|---|
| Polyvinyl chloride | 100 |
| Nylon acid ester (mixed isodecyl esters of adipic, glutaric and succinic acids) | 40 |
| Stabilizer dibutyl tin dilaurate | 3 | spread over the surface. After 2 hours the whole was subjected to a temperature of 195° for approximately 1 minute. Only the film where the ink had been applied was expanded, producing an embossed effect 0.2 millimetre deep corresponding to the pattern applied.

EXAMPLE 6

A polyvinyl chloride paste consisting of:

| | Parts |
|---|---|
| Polyvinyl chloride | 100 |
| Dioctyl phthalate | 70 |
| Azodicarbonamide | 1.5 |
| Barium/cadmium octoate stabilizer with a high percentage of barium | 3 |
| Whiting | 5 |
| Pigment | 3 | was spread in the usual way onto fabric or release paper and then gelled to a low degree at a temperature of 110° C. for 1.75 minutes.

An ink consisting of:

| | Parts |
|---|---|
| Acrylate polymer | 24 |
| Ethylacetate | 56 |
| Zinc octoate | 20 |
| Pigment | 3 | having a viscosity of 1,600 centipoises was applied as a pattern to portions of the surface.

The ink was allowed to dry, and a transparent film made up of:

| | Parts |
|---|---|
| Polyvinyl chloride | 100 |
| Nylon acid ester (mixed isodecyl esters of adipic, glutaric and succinic acid) | 40 |
| Stabilizer dibutyl tin dilaurate | 3 | spread over the surface. After 3 hours the whole was subjected to a temperature of 195° for approximately 1 minute. Only where the ink had been applied was expanded producing an embossed effect 0.25 millimetre deep corresponding to the pattern applied.

We claim:

1. A process for embossing by selective expansion a thermoplastic polymeric material which comprises forming into sheet form, an expandable mix containing a thermoplastic polymeric material and a blowing agent, applying to selected areas of the surface of the sheet an activator ink containing a compound which lowers the decomposition temperature of the blowing agent, and heating the sheet to a temperature and for a time such that in those areas of the sheet in contact with said compound, the blowing agent is decomposed to a greater degree than in the remaining areas and the sheet is thereby differentially expanded.

2. A process as claimed in claim 1 wherein the polymeric material is a polymerisation product of a halogen substituted olefin.

3. A process for embossing by selective expansion a thermoplastic polymeric material as claimed in claim 1 wherein the expandable mix contains a vinyl chloride polymer and azodicarbonamide as a blowing agent, applying to selected areas of the surface of the sheet an activator ink containing a compound which lowers the decomposition temperature of the azodicarbonamide and heating the sheet to a temperature and for a time such that in those areas of the sheet in contact with the activator ink the azodicarbonamide is decomposed to a greater degree than in the remaining areas and the sheet is thereby differentially expanded.

4. A process as claimed in claim 3 wherein the particles of azodicarbonamide have a surface area in the range of 4,000 to 6,000 square centimeters per gram.

5. A process as claimed in claim 3 wherein the amount of azodicarbonamide is in the range 1–10% by weight based on the weight of the vinyl chloride polymer.

6. A process as claimed in claim 1 wherein the activator ink consists essentially of a mixture of a compound which lowers the decomposition temperature of the blowing agent a polymeric material and a pigment.

7. A process as claimed in claim 1 wherein said compound is selected from the group consisting of zinc oxide, zinc octoate, zinc nitrate, zinc fatty acid soaps, cadmium octoate, cadmium fatty soaps, lead carbonate, lead phthalate, lead phosphite, lead stearate, urea, borax, ethanolamine, glycols and a second blowing agent.

8. A process as claimed in claim 3 wherein said compound is a zinc octoate.

9. A process as claimed in claim 6 wherein the polymeric material is selected from the group consisting of polyvinyl chloride, and a copolymer of vinyl chloride and vinyl acetate.

10. A process as claimed in claim 6 wherein said mixture includes a solvent for said polymeric material; said solvent also acting as a dispersant for vinyl chloride polymers in the expandable mix.

11. A process as claimed in claim 10 wherein the solvent is selected from ketones, esters, chlorinated hydrocarbons and nitro compounds.

12. A process as claimed in claim 1 wherein the activator ink contains about 5 to 25% by weight of said compound.

13. A process as claimed in claim 3 wherein the expandable mix is made as a plastisol.

14. A process as claimed in claim 1 wherein the mix contains a stabilizer and the stabilizer is selected from the group consisting of metal salts of lead, cadmium, barium, and zinc.

15. A process as claimed in claim 13 wherein the plastisol is gelled to the minimum extent which will permit printing by the activator ink.

16. A process as claimed in claim 13 wherein the plastisol is gelled at a temperature in the range 100° C. to 150° C. for a period of time in the range 2.5 minutes to 0.5 minute.

17. A process as claimed in claim 1 wherein a period of time of 1 to 24 hours is allowed to elapse between application of the activator ink to the sheet of the expandable mix and the heating of the sheet of polymer.

18. Chemically embossed expanded polymeric products when prepared by the process as claimed in claim 1.

19. A chemically embossed, expanded polymeric sheet material characterized by having a preselected, embossed raised surface area therein, the selected embossed area containing a compound which permitted the decomposition of the blowing agent used to expand the sheet material at a temperature lower than the temperature at which the blowing agent decomposed in the surrounding area.

20. An activator ink adapted to be applied to a sheet formed from an expandable mix containing a thermoplastic polymeric material and a blowing agent said ink comprising a mixture of compound which lowers the decomposition point of the blowing agent and a polymeric material.

21. An activator ink as claimed in claim 20 which contains 5 to 15% by weight of said compound.

22. A product as claimed in claim 18 wherein the activator ink contains zinc octoate.

23. A sheet product adapted upon heat treatment to form an embossed surface which comprises a sheet of a composition containing a thermoplastic polymeric material and a blowing agent having applied to selected areas of the surface thereof an activator ink containing a compound which lowers the decomposition temperature of the blowing agent.

References Cited
UNITED STATES PATENTS

| | | | |
|---|---|---|---|
| 3,293,094 | 12/1966 | Nairn et al. | 264—47 XR |
| 3,293,108 | 12/1966 | Nairn et al. | 264—47 XR |
| 3,373,072 | 3/1968 | Jones | 264—52 XR |
| 3,382,194 | 5/1968 | Birkett | 264—54 XR |
| 3,386,878 | 6/1968 | Pooley | 264—54 XR |
| 3,399,106 | 8/1968 | Palmer et al. | 264—51 XR |

PHILIP E. ANDERSON, Primary Examiner

U.S. Cl. X.R.

106—27; 117—37; 161—116; 264—47, 52